US009044721B2

(12) United States Patent
Forsberg

(10) Patent No.: US 9,044,721 B2
(45) Date of Patent: Jun. 2, 2015

(54) FUEL INJECTION DEVICE AND METHOD FOR A FUEL REFORMER

(75) Inventor: Peter Forsberg, Göteborg (SE)

(73) Assignee: POWERCELL SWEDEN AB, Göteborg (SE)

( * ) Notice: Subject to any disclaimer, the term of this patent is extended or adjusted under 35 U.S.C. 154(b) by 866 days.

(21) Appl. No.: 13/255,513

(22) PCT Filed: Mar. 13, 2009

(86) PCT No.: PCT/SE2009/000138
§ 371 (c)(1),
(2), (4) Date: Nov. 15, 2011

(87) PCT Pub. No.: WO2010/104424
PCT Pub. Date: Sep. 16, 2010

(65) Prior Publication Data
US 2012/0153035 A1    Jun. 21, 2012

(51) Int. Cl.
*B05B 15/00* (2006.01)
*B01J 4/00* (2006.01)
*C01B 3/38* (2006.01)

(52) U.S. Cl.
CPC .......... *B01J 4/002* (2013.01); *B01J 2204/002* (2013.01); *B01J 2219/00135* (2013.01); *B01J 2219/00155* (2013.01); *C01B 3/38* (2013.01); *C01B 2203/0227* (2013.01)

(58) Field of Classification Search
CPC .............. B01J 4/002; B01J 2204/002; B01J 2219/0015; B01J 2219/00135; B01J 2219/00155; C01B 3/38; C01B 2203/0227
USPC ............... 239/132, 135, 397.5, 128; 423/650
See application file for complete search history.

(56) References Cited

U.S. PATENT DOCUMENTS

| 5,915,626 | A | 6/1999 | Awarzamani et al. |
| 6,481,641 | B1 * | 11/2002 | Mieney .................... 239/139 |
| 7,506,824 | B2 * | 3/2009 | Nau et al. ................ 239/397.5 |
| 7,766,251 | B2 * | 8/2010 | Mao et al. ................... 239/13 |
| 2005/0227130 | A1 | 10/2005 | Ahluwalia et al. |
| 2006/0159437 | A1 | 7/2006 | Miller |
| 2007/0187372 | A1 * | 8/2007 | Rabinovich et al. ...... 219/121.36 |
| 2007/0235086 | A1 * | 10/2007 | Hornby et al. ................ 137/334 |

FOREIGN PATENT DOCUMENTS

| CN | 1651728 A | 8/2005 |
| EP | 1323918 A2 | 7/2003 |
| EP | 1801907 A2 | 12/2006 |
| GB | 182443 A | 8/1923 |
| JP | 2003306304 A | 10/2003 |
| JP | 2006312914 A | 11/2006 |

(Continued)

OTHER PUBLICATIONS

Japanese Official Action (translation) (Jul. 18, 2013) for corresponding Japanese Application 20110-553976.

(Continued)

*Primary Examiner* — Dinh Q Nguyen
(74) *Attorney, Agent, or Firm* — WRB-IP LLP

(57) ABSTRACT

In a fuel injection device and method for injecting hydrocarbon fuel into a fuel reformer, the temperature of the fuel injection device is regulated by simultaneously heating the fuel and cooling the fuel injection device.

12 Claims, 2 Drawing Sheets

(56) References Cited

FOREIGN PATENT DOCUMENTS

JP 2008223866 A 9/2007
WO 2008131494 A1 11/2008

OTHER PUBLICATIONS

Chinese Official Action (translation) (Apr. 19, 2013) for corresponding Chinese Application 200980158056.7.

Supplementary European Search Report (Sep. 18, 2013) for corresponding European Application EP 09 84 1589.

International Search Report for correspondinig International Application PCT/SE2009/000138.

International Preliminary Report on Patentability for corresponding International Application PCT/SE2009/000138.

* cited by examiner

FUEL INJECTION DEVICE AND METHOD FOR A FUEL REFORMER

BACKGROUND AND SUMMARY

The present invention relates to a fuel injection device and a fuel injection method, in particular for a fuel reformer for generating hydrogen rich gas from hydrocarbon fuel, wherein the fuel, which is injected through the fuel injection device, is heated by a heating element arranged in the fuel injection device.

For the operation of fuel cells which provide electric energy for a vehicle, hydrogen is necessary. This hydrogen can be directly stored in a tank, but this storage is technically complicated and dangerous due to the explosiveness of hydrogen. Therefore, it has proven useful to generate a hydrogen rich gas from preferably liquid hydrocarbon fuel through catalytic conversion. The catalytic conversion of the hydrocarbons is carried out in several successive steps, the actual reforming, in which the hydrocarbons are broken down into the hydrogen rich gas comprising hydrogen, carbon monoxide, carbon dioxide and steam in accordance with the thermodynamic equilibrium, as well as a subsequent staged water-gas shift reaction, during which carbon monoxide and water are catalytically converted into carbon dioxide and hydrogen.

For the first step in this process, namely the catalytic conversion of hydrocarbon fuel to a hydrogen rich gas, a so called fuel reformer is used. For good operating modes of the fuel reformer it has been shown that a successful and efficient conversion of a hydrocarbon fuel into a hydrogen rich gas is, among others, dependent on a successful mixing of the reactants. For that mixing it has proven useful to spray the hydrocarbon fuel into the fuel reformer, whereby a good atomization or vaporization of the hydrocarbon fuel can be achieved.

The quality of the atomization or vaporization of the hydrocarbon fuel depends among other on the viscosity of the fuel. By preheating the hydrocarbon fuel, the viscosity of the fuel can be increased, whereby an advantageous level of viscosity of the hydrogen fuel can be achieved. For such an advantageous level of viscosity, the corresponding temperature of the hydrocarbon fuel is typically between circa 50° C. and circa 80° C.

From the state of the art, there are known a plurality of fuel injection nozzles with preheating elements for preheating the hydrocarbon fuel during a startup process and for keeping the fuel at the preferred temperature. Such fuel injection nozzles with heating devices are described for example in EP1323918, US 20060159437, EP1801907 or US20050227130.

The problem with these known fuel injection devices with preheating devices is how to regulate the temperature of the fuel after the startup process. Since known fuel reformers operate at temperatures between typically circa 600° C. and circa 900° C., the fuel injection nozzles, which are mounted at the fuel reformer are also heated. Thereby, also the temperature of the fuel increases which has the consequence that the desired temperature range of circa 50° C. to circa 80° C. for the fuel where advantageous levels of viscosity of the fuel can be achieved cannot be maintained.

Additionally, due to the high temperatures of the fuel injection nozzle coke and/or soot can deposit on the fuel injection nozzle. It is therefore necessary to control and regulate the temperature of the hydrocarbon fuel. For that purpose it is known to use complex temperature regulating circuits, which include e.g. a plurality of actuated valves to keep the hydrocarbon fuel in the preferred temperature range.

It is therefore desirable to provide a fuel injection device and a method for injecting hydrocarbon fuel into a fuel reformer which allows with a reduced number of control functions to maintain the temperature of the fuel within a wanted temperature range.

Aspects of the present invention are based on the idea to provide a fuel injection device, which is adapted to be mounted to a hot device, such as a fuel reformer or a gas turbine, and provides a cooling of the outside of the fuel injection device while simultaneously provides a heating of the hydrocarbon fuel by means of a heating device. By the simultaneous heating and cooling, hydrocarbon fuel having the desired viscosity for a good atomization is provided. The cooling of the outside of the fuel injection device has the further advantage that a heat transfer from the hot device, e.g. the fuel reformer, to the fuel injection device can be reduced, whereby the undesired heating of the hydrocarbon fuel due to the heat of the hot device prior to the injection can be prevented.

A fuel injection device according to an aspect of the invention may comprise a fuel injection device inlet for receiving hydrocarbon fuel, a fuel injection device socket, which is preferably adapted to be mounted to a fuel reformer, and a fuel injection device outlet for releasing hydrocarbon fuel, preferably into a fuel reformer. The heating device is preferably arranged near the fuel injection device inlet and can be thermally insulated from the cooling device.

According to a preferred embodiment, the cooling is arranged so that primarily the fuel injection device socket is cooled. This in turn results in a pre-cooling of the hydrocarbon fuel prior to its injection, as the fuel injection device socket is preferably in thermal contact with the hydrocarbon fuel. Since the fuel injection device socket is also in thermal contact with the fuel injection device outlet, the cooling of the fuel injection device socket also provides a cooling of the fuel injection device outlet. Thereby, also the deposit of coke at the fuel injection device can be minimized.

Further, by providing the cooling of the fuel injection device, the hydrocarbon fuel can be kept at a temperature below or at the temperature for the preferred fuel viscosity, even if the fuel injection device is subjected to a very hot environment, e.g. to the fuel reformer. It is further preferred to provide a temperature regulating element for sensing the temperature of the hydrocarbon fuel and/or regulating the heating device. Thereby, the hydrocarbon fuel can be heated, in case the temperature of the fuel is below a preferred temperature, and in case the hydrocarbon fuel is already at the preferred temperature, the heating of the fuel is not applied.

According to a preferred embodiment, a cooling device can be provided by supplying a cooling fluid, preferably cooling water, at the fuel injection device socket, and from there a cooling is also provided at the fuel injection device outlet, since the fuel injection device socket and the fuel injection device outlet are in thermal contact.

The cooling fluid is preferably supplied through a cooling fluid inlet pipe, which is preferably arranged in a space between an inner wall and an outer wall of the cooling device, and terminates near the fuel injection device socket, from where the cooling fluid may flow freely into the space defined between the inner wall and the outer wall of the cooling device. Preferably, the inner wall is, at least in this area, in thermal contact with the fuel injection device socket. Further a cooling fluid outlet pipe can be provided, which is adapted to collect and drain off the cooling fluid. Preferably, the cooling fluid outlet pipe is arranged near the fuel injection device inlet.

According to a further embodiment, an improved thermal contact between the fuel injection device socket and the cooling water is provided by arranging cooling fins at least partially around the fuel injection device socket, whereby the fuel injection device socket is cooled efficiently.

According to a further preferred embodiment, the hydrocarbon fuel is directed from the fuel injection device inlet through the fuel injection device socket to the fuel injection device outlet by a fuel directing element, such as a tube, around which the heating device can be arranged. Preferably, the heating device is an electrical heating wire which is wound around the fuel directing element. Advantageously, an electrical insulating layer can be arranged between the fuel directing element and the heating wire.

According to another advantageous embodiment, the heating wire is covered with a layer of thermal insulation. The thickness of the thermal insulation layer is preferably comparable to or greater than the thickness of the heating wire. Preferably, the insulation layer is covered by a cover element, which is preferably made from stainless steel, and can be designed as the inner wall of the cooling device.

The heat transfer to the fuel directing element and thereby the temperature of the fuel can be regulated by a simple thermostat which is preferably arranged near the heating element. The thermostat preferably senses the temperature of the fuel directing element and thereby of the fuel and controls the heating device in accordance to the sensed temperature.

According to a further preferred embodiment, the thermostat can regulate the heating wire, whereby the hydrocarbon fuel can be kept at the preferred temperature in the range of circa 50° C. to circa 80° C.

Since the thermal insulation layer keeps the heated fuel apart from the cooling device, a temperature control of the cooling device is not necessary. Therefore, according to a further preferred embodiment, the amount of cooling fluid needs not to be regulated.

According to a further preferred embodiment, an outer tube, preferably in the area of the fuel injection device socket, is arranged around the outer wall of the cooling device, wherein preferably the diameter of the outer tube is greater than the diameter of the outer wall of the cooling device. Therefore, the outer tube provides a thermal insulation of the outside of the fuel injection device to its environment, e.g. a fuel reformer wall. Preferably, the diameter of the outer tube is adapted to provide a maximal heat conducting distance while in parallel not unduly increasing the overall diameter of the fuel injection device. In the space between the outer wall of the cooling and the outer tube, a thermal insulating material can be advantageously provided. Since this outer tube keeps the (temperature regulated) fuel injection device away from a hot environment, e.g. the hot fuel reformer walls, the heat influence of the environment, e.g. of the fuel reformer, to the fuel injection device and thereby to the fuel is considerably reduced.

Further advantages and preferred embodiments are defined in the claims, the description and the Figures.

BRIEF DESCRIPTION OF THE DRAWINGS

In the following the principle of an aspect of the present invention shall be explained by means of a preferred embodiment shown in the Figures. The exemplarily illustrated embodiment is thereby not intended to limit the scope of the invention, which is defined by the appending claims only.

The Figures show.

DETAILED DESCRIPTION

Figure 1:
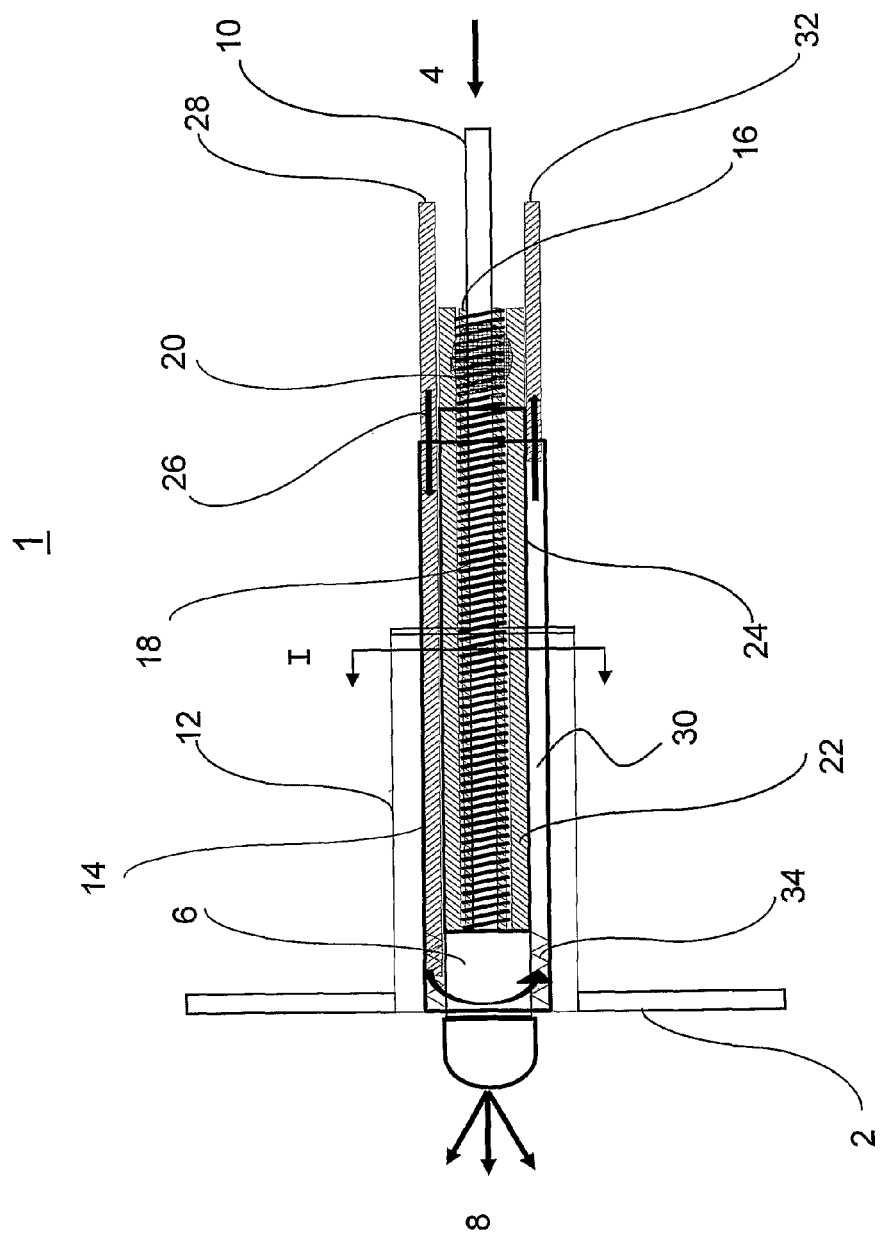
FIG. 1: a schematic side view section of a preferred embodiment of the inventive fuel injection device.

FIG. 1 shows a preferred embodiment of the inventive fuel injection device 1 which can be mounted into a wall 2 of a reformer (not shown) which is supposed to generate a hydrogen rich gas from hydrocarbon fuel. The fuel injection device 1 further comprises a fuel injection device inlet 4 for receiving hydrocarbon fuel, a fuel injection device socket 6, which is preferably adapted to be mounted to a hot device, e.g. the fuel reformer, and a fuel injection device outlet 8 for releasing hydrocarbon fuel, preferably into the hot device, e.g. into a mixing chamber of the fuel reformer. The hydrocarbon fuel is led in a fuel directing element, particularly a fuel directing tube 10 from the fuel injection device inlet 4 through the fuel injection device socket 6 to the fuel injection device outlet 8. The fuel injection device socket 6 is further adapted to provide a mounting base for the other fuel injection device parts according to an aspect of the invention.

Even if the fuel injection device 1 is described in the following as being mounted to the wall 2 of a fuel reformer, it should be noted that the inventive fuel injection device 1 can be also used for any other hot device into which liquid or gaseous hydrocarbon fuel is to be injected. Another hot device is for example a gas turbine or a combustion engine.

Further, in the following the fuel injection device is, by way of example, illustrated as having a cylindrical shaped cross sectional profile but any other cross sectional profile suitable for a fuel injection device is also encompassed by the scope of the claimed invention.

The fuel injection device 1 is, at least in the area of the fuel injection device socket 6 surrounded by an outer tube 12, which can be in contact with the hot device, e.g. the reformer wall 2, and which provides a thermal insulation between the reformer wall 2 and an outside 14 of the fuel injection device 1 by having a greater diameter than the outside 14 of the fuel injection device 1.

The diameter of the outer tube 12 is chosen in such a manner that the heat conducting distance between the reformer wall 2 and the outside 14 of the fuel injection device 1 is maximized. Preferably, it is also taken into account not to unduly increase the overall diameter of the fuel injection device 1.

The fuel directing tube 10 is preferably centrally arranged in the fuel injecting device 1 and can be covered by an electrical insulating film 16, which electrically insulates the fuel directing tube 10 to its outside. On the outside of this film 16, a heating wire 18 is applied which provides a heating device for heating the hydrocarbon fuel by heating the fuel directing tube 10. The heating wire 18 is preferably made from canthal.

The temperature of the fuel directing tube 10 is regulated by a thermostat 20 which controls the electric energy transferred to the heating wire 18 in accordance with the temperature of the fuel directing tube 10 detected by the thermostat 20.

The heating wire 18 is covered by a layer of thermal insulation 22, which in turn is covered by a cover tube 24, which is preferably made from stainless steel. The thickness of the thermal insulation layer 22 is preferably comparable with or greater than the thickness of the heating wire 18.

It goes without saying, that in case the fuel injection device 1 does not have a cylindrical shape, as mentioned above, the tubes need not be designed as cylindrical elements as well, but can have any suitable design and shape.

Outside the cover tube 24, a cooling device is arranged. The cooling device is preferably a device leading a cooling fluid 26, such as cooling water, to the fuel injection device socket 6, and draining off the warmed cooling fluid, whereby the fuel injection device socket 6 is cooled. Since the fuel injection device socket 6 is in thermal contact with the fuel injection device outlet 8 and the fuel directing tube 10, heat is conducted from the fuel and the fuel injection device outlet 8 to the cooling fluid 26. Since the outer tube 12 provides a thermal insulation between the fuel injection device outside 14 and the reformer wall 2, and thereby also between the cooling device outside and the reformer wall 2, the cooling device is not affected by the hot device (in FIG. 1: the fuel reformer) the fuel injection device is mounted at.

Figure 2:
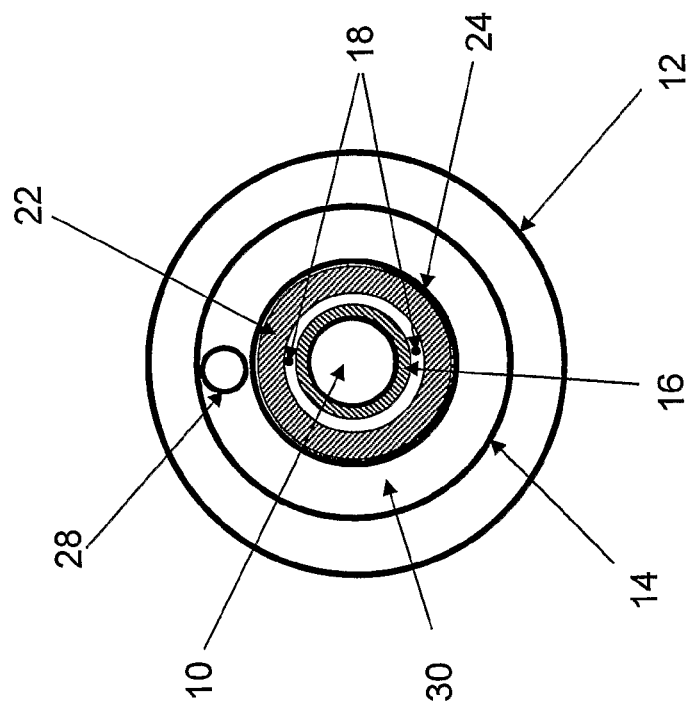
FIG. 2: a schematic cross section through the preferred embodiment shown in FIG. 1.

The cooling device may comprise an inner wall, which can be provided by the cover tube 24, and an outer wall, which can provide the outside 14 of the fuel injection device 1, as can be seen in the preferred and illustrated embodiment of FIG. 1 and FIG. 2.

The cooling device further comprises a cooling fluid inlet pipe 28, which directs cooling fluid 26, particularly cooling water, from the fuel injection device inlet 4 to the fuel injection device socket 6. The cooling fluid inlet pipe 28 terminates near the fuel injection device outlet 8, and the cooling fluid 26 is allowed to flow into a space 30 defined between the cover tube 24, which defines the inner wall, and the outer wall 14 of the cooling device. The warmed cooling fluid 26 is directed back in the direction of the fuel injection device inlet 4, where it is collected and drained off near the fuel injection device inlet 4 by a cooling fluid outlet pipe 32. The stream of the cooling fluid 26 is also indicated by the arrows in FIG. 1.

At least partly around the fuel injection device socket 6, additional cooling fins 34 can be arranged, which provide an improved thermal contact between the cooling fluid 26 flowing freely in space 30 and the fuel injection device socket 6. Thereby, the hydrocarbon fuel which streams through the fuel injection device socket 6 can be efficiently cooled.

The cooling fluid 26 gradually rises in temperature as it is guided from the fuel injection device inlet 4 to the fuel injection device outlet 8. In order not to direct heated cooling fluid 26 back to the fuel injection device socket 6, the cooling fluid outlet pipe 32 is provided in the vicinity of the fuel injection device inlet 4.

The thermal insulation layer 22 insulates the heated fuel thermally from the cooling fluid 26 so that usually a control of the cooling fluid amount is not necessary.

The cooling device arranged at the outside of the fuel injection device socket 6, as illustrated in FIG. 1, has the further advantage that the outside 14 of the fuel injection device 1 can be cooled. Since the cooled fuel injection device socket 6 is also in thermal contact with the fuel injection device outlet 8, the deposit of coke at the fuel injection device 1 can be prevented. Nevertheless, the temperature of the fuel sprayed into the fuel reformer (not shown) by the fuel injection device 1 is not affected, as the heating device 18 provides the temperature for the optimal viscosity of the fuel.

The additionally arranged outer tube 12 also prevents heat transfer from a hot device, e.g. the reactor wall 2 of the fuel reformer, to the fuel injection device 1, whereby the temperature of the fuel injection device 1 and the fuel is not affected by the hot environment.

FIG. 2 shows a cross section of the inventive fuel injection device 1 as illustrated in FIG. 1 along line 1 in FIG. 1.

FIG. 2 shows the layered structure of the fuel injection device 1 with the fuel directing tube 10 having the smallest diameter in the center. The fuel directing tube 10 is covered by the electrical insulation 16 around which the heating wire 18 is wound. The heating wire 18 is covered by the thermal insulation 22, which in turn is covered by the cover tube 24. The thermal insulation layer 22 can either cover the heating wire 18 as illustrated in FIG. 2, but it is also possible that the heating wire 18 is embedded in the thermal insulation layer 22.

The cooling device is provided outside of the cover tube 24, whereby the cover tube 24 provides the inner wall of the cooling device. The outer wall 14 of the cooling device is, at the same time, the outside 14 of the fuel injection device 1, which can be also a stainless tube as the inner wall. In the space 30 between the cover tube 24 and the outer wall 14 of the cooling device the cooling fluid inlet pipe 28 is arranged for guiding cooling fluid 26 to the fuel injection device socket 6.

The whole fuel injection device 1 is encompassed, at least in the area of the fuel injection device socket 6 by the outer tube 12 (which is in FIG. 1 extended beyond line 1 towards the fuel injection device inlet 4), which provides the thermal insulation to the hot device (in FIG. 1 the reformer) the fuel injection device 1 is mounted at.

By simultaneously heating the hydrocarbon fuel inside the fuel injection device 1 and cooling the outside of the fuel injection device by applying cooling water in a manner, preferably controlled by the thermostat 20 (FIG. 1), the deposit of coke and soot at the inside and outside of the fuel injection device can be considerably reduced or, in the best case, even prevented, although the fuel is kept at the optimal temperature for the advantageous viscosity of the fuel.

REFERENCE LIST 1 fuel injection device
2 reformer wall
4 fuel injection device inlet
6 fuel injection device socket
8 hydrocarbon fuel device outlet
10 hydrocarbon fuel directing element
12 outer tube
14 fuel injection device outside
16 electric insulation
18 heating wire
20 thermostat
22 thermal insulation
24 cover tube
26 cooling fluid
28 cooling fluid inlet pipe
30 space between cover tube 24 and fuel injection device outside 14
32 cooling fluid outlet pipe
34 cooling fins

The invention claimed is:

1. A fuel injection device for a fuel reformer for generating hydrogen rich gas from hydrocarbon fuel; comprising
a heating device for heating the hydrocarbon fuel,
a cooling device for cooling the outside of the fuel injection device wherein the heating device and the cooling device are simultaneously operable so that a temperature of the hydrocarbon fuel is controllable to be within a predetermined temperature range,
a thermal insulation layer, and
wherein the heating, device is covered by a cover element and the cooling device is arranged outside of the cover element, and wherein the thermal insulation layer is arranged between the heating device and the cover element.

2. Fuel injection device according to claim 1, further comprising a fuel injection device inlet for receiving hydrocarbon fuel, a fuel injection device socket adapted to be mounted to a fuel reformer, and a fuel injection device outlet for releasing hydrocarbon fuel, wherein the cooling device is further adapted to provide at least one of a cooling of the fuel injection device socket and of the fuel injection device outlet.

3. Fuel injection device according to claim 2, wherein the fuel injection device further comprises a fuel directing element for directing a hydrocarbon fuel flow from the fuel injection device inlet to the fuel injection device outlet.

4. Fuel injection device according to claim 3, wherein the heating device is an electrical heating wire which is wound around the fuel directing element, wherein the fuel directing element is electrically insulated from the heating device.

5. Fuel injection device according to claim 3, wherein the fuel injection device socket is in thermal contact with the fuel directing element.

6. Fuel injection device according to claim 3, further comprising, a temperature regulating element, for regulating the temperature of the fuel directing element and thereby the temperature of the hydrocarbon fuel inside the fuel directing element.

7. Fuel injection device according to claim 1, wherein the thermal insulation layer, which is adapted to thermally insulate the heating device from the cooling device.

8. Fuel injection device according to claim 7, wherein the heating device is at least one of covered by and embedded in the thermal insulation layer.

9. Fuel injection device according to claim 1, wherein the cooling device has an inner wall and an outer wall, wherein a cooling fluid is contained in the space between the inner wall and the outer wall.

10. Fuel injection device according to claim 9, wherein the cooling device further comprises a cooling fluid inlet pipe which is at least one of arranged inside the space between the inner wall and the outer wall and arranged inside ends near the fuel injection device socket, and a cooling fluid outlet pipe, which is at least one of arranged inside the space between the inner wall and the outer wall arranged to collect the cooling fluid near the fuel injection device inlet.

11. Fuel injection device according to claim 1, wherein the cooling device further comprises cooling fins, which are arranged near the fuel injection device socket.

12. Fuel injection device according to claim 1, further comprising an outer cover element covering at least part of the cooling device, wherein the outer cover element is adapted to provide a thermal insulation between the fuel injection device and the fuel injection device environment.

* * * * *